Patented July 26, 1932

1,868,532

UNITED STATES PATENT OFFICE

ALPHONS O. JAEGER, OF MOUNT LEBANON, PENNSYLVANIA, ASSIGNOR TO THE SELDEN COMPANY, OF PITTSBURGH, PENNSYLVANIA, A CORPORATION OF DELAWARE

PRODUCTION OF ARYL KETONES

No Drawing. Application filed July 31, 1931. Serial No. 554,377.

The present invention relates to processes of producing ketones containing two mononuclear aryl groups including benzophenone and its homologues and substitution products.

It has been proposed in United States Patent 1,814,025 to Dougherty to produce benzophenone by heating benzoylbenzoic acid or its homologues in the presence of a small amount of a metal compound as a catalyst taken from the metals copper, nickel, cobalt, iron and platinum.

I have found that better results are obtained when zinc compounds are used as a catalyst and satisfactory results may also be obtained from compounds of cadmium, silver, aluminum, titanium, zirconium, lead, thorium, vanadium, chromium, molybdenum, tungsten, manganese.

The temperatures used will range from about 200° C. to around 350° C. and in general the zinc and other catalysts of the present invention can be used under the reaction conditions described in the Dougherty patent referred to.

Zinc oxide is the simplest compound to be used, but other salts may be employed, notably the zinc salt of the benzoylbenzoic acid itself.

The invention will be described in greater detail in the following specific examples:

Example 1

Benzoylbenzoic acid is heated with from ¼ to 6% of zinc oxide, the temperature being maintained between 250 and 270° C., carbon dioxide being given off vigorously. Preferably the mixture is thoroughly stirred and the heating continued until evolution of carbon dioxide ceases, whereupon the temperature may be raised and the benzophenone formed distilled out, preferably by distilling out with steam.

Example 2

Toluylbenzoic acid is heated with 10% of zinc toluylbenzoate or with 15–18% of aluminum toluylbenzoate. The temperature and reaction conditions are the same as in Example 1 and a good yield of toluphenone is obtained.

Example 3

Xyloylbenzoic acid is heated with 5% of zinc oxide or 10–12% of cadmium oxide, the reaction conditions being the same as in Example 1, except that the temperature during the reaction may be slightly raised without serious losses of the xylylphenone.

Preferably the ketones formed are recovered by steam distillation as this minimizes decomposition and permits operation at moderate temperatures. However, any other suitable method of recovery may be used.

What is claimed as new is:

1. A process of producing ketones of the benzophenone type, which comprises heating a benzoylbenzoic acid in the presence of a small amount of a compound of a metal included in the group consisting of zinc, cadmium, silver, aluminum, titanium, zirconium, lead, thorium, vanadium, chromium, molybdenum, tungsten, manganese, to a temperature sufficiently high to cause liberation of carbon dioxide and maintaining the heating until evolution of the carbon dioxide ceases and then recovering the ketone formed.

2. A method according to claim 1, in which the compound is a salt of the benzoylbenzoic acid treated.

3. A method according to claim 1, in which the ketone is recovered by steam distillation.

4. A method of producing benzophenone, which comprises heating benzoylbenzoic acid in the presence of a small amount of a compound of a metal included in the group consisting of zinc, cadmium, silver, aluminum, titanium, zirconium, lead, thorium, vanadium, chromium, molybdenum, tungsten, manganese, to a temperature sufficiently high to cause liberation of carbon dioxide and maintaining the heating until evolution of the carbon dioxide ceases and then recovering the benzophenone formed.

5. A method according to claim 4, in which the catalyst is a benzoylbenzoate of the metal used.

6. A method according to claim 4, in which the benzophenone is recovered by steam distillation.

7. A process of producing ketones of the benzophenone type, which comprises heating a benzoylbenzoic acid in the presence of a small amount of a compound of a metal included in the group consisting of zinc, cadmium, to a temperature sufficiently high to cause liberation of carbon dioxide and maintaining the heating until evolution of the carbon dioxide ceases and then recovering the ketone formed.

8. A method according to claim 7, in which the compound is a salt of the benzoylbenzoic acid treated.

9. A method according to claim 7, in which the ketone is recovered by steam distillation.

10. A method of producing benzophenone, which comprises heating benzoylbenzoic acid in the presence of a small amount of a compound of a metal included in the group consisting of zinc, cadmium, to a temperature sufficiently high to cause liberation of carbon dioxide and maintaining the heating until evolution of the carbon dioxide ceases and then recovering the benzophenone formed.

11. A method according to claim 10, in which the catalyst is zinc benzoylbenzoate.

12. A method according to claim 10, in which the benzophenone is recovered by steam distillation.

13. A process of producing ketones of the benzophenone type, which comprises heating a benzoylbenzoic acid in the presence of a small amount of a zinc compound to a temperature sufficiently high to cause liberation of the carbon dioxide, maintaining the heating until the evolution of carbon dioxide ceases and recovering the metal formed from the mixture.

14. A method according to claim 13, in which the catalyst is zinc benzoylbenzoate.

15. A method according to claim 13, in which the ketone is recovered by steam distillation.

16. A process of producing benzophenone, which comprises heating benzoylbenzoic acid in the presence of a small amount of a zinc compound to a temperature sufficiently high to cause liberation of carbon dioxide, continuing the heating until evolution of carbon dioxide ceases and recovering the benzophenone from the reaction mixture.

17. A method according to claim 16, in which the catalyst is zinc benzoylbenzoate.

18. A method according to claim 16, in which the benzophenone is recovered by steam distillation.

Signed at Pittsburgh, Pennsylvania, this 29th day of July, 1931.

ALPHONS O. JAEGER.